United States Patent [19]
Willis et al.

[11] Patent Number: 5,568,784
[45] Date of Patent: Oct. 29, 1996

[54] FLAG SUPPORT SYSTEM

[76] Inventors: Tucker Willis, 4525 Bluffview Blvd., Dallas, Tex. 75209; James Cinquemani, Jr., 2412 Hardwick, Dallas, Tex. 75208

[21] Appl. No.: 440,757

[22] Filed: May 15, 1995

Related U.S. Application Data

[63] Continuation-in-part of Ser. No. 276,068, Jul. 15, 1994.

[51] Int. Cl.⁶ .............................. G09F 17/00; F16M 13/00
[52] U.S. Cl. ............................... 116/173; 248/514; 403/3; 403/205
[58] Field of Search ....................... 116/173–175; 248/535, 558, 514, 520, 538; 403/4, 379, 205, 3; 40/606

[56] References Cited

U.S. PATENT DOCUMENTS

| | | | |
|---|---|---|---|
| 1,119,147 | 12/1914 | Fillmore . | |
| 1,273,098 | 7/1918 | Schumann | 173/59 |
| 1,294,170 | 2/1919 | Robinson | 116/173 |
| 1,311,712 | 7/1919 | Power . | |
| 1,338,210 | 4/1920 | Buckley . | |
| 2,280,476 | 4/1942 | Calvert | 248/145 |
| 2,646,240 | 2/1950 | Anderson | 116/173 |
| 2,794,414 | 6/1957 | Reifschneider | 116/173 |
| 3,812,815 | 5/1974 | Kuenzel | 116/173 |
| 4,231,540 | 11/1980 | Duncan et al. | 248/558 |
| 4,593,877 | 6/1986 | van der Wyk | 248/538 |
| 4,601,255 | 7/1986 | Marcotti | 116/173 |
| 5,156,110 | 10/1992 | Fuller | 116/173 |
| 5,335,621 | 8/1994 | Willis | 116/173 |

FOREIGN PATENT DOCUMENTS

| | | |
|---|---|---|
| 145273 | 5/1954 | Denmark . |
| 838460 | 3/1939 | France . |
| 296292 | 7/1915 | Germany . |
| 182916 | 5/1936 | Switzerland . |

OTHER PUBLICATIONS

Eder Flag Manufacturing Company, Inc.; Oak Creek, Wisconsin; 1991 Catalog; pp. 18–19, 56, 61–62, 68, 73, 75.

Flagpole Components, Inc.; Addison, Texas; Catalog #2, 1992; pp. 2, 8, 13.

Dettra Flag Company (D.F.C.); 1991 Catalog; pp. 5–7, 43, 45, 49, 64.

EMC, A Division of Eder Manufacturing Corporation; Custom Flags & Banners/Flagpoles & Accessories; 1991; pp. 60–61.

Concord Industries, Inc.; Addison, Texas; Flagpoles Catalog; 1992; pp. 15–16.

*Primary Examiner*—William A. Cuchlinski, Jr.
*Assistant Examiner*—Andrew Hirshfeld
*Attorney, Agent, or Firm*—Jenkens & Gilchrist, a Professional Corporation

[57] ABSTRACT

A flag staff assembly includes an elongated flag staff adapted for the support of a flag thereon and a re-angulating staff assembly with male and female ends permitting selective positioning of the flag staff therefrom.

12 Claims, 3 Drawing Sheets

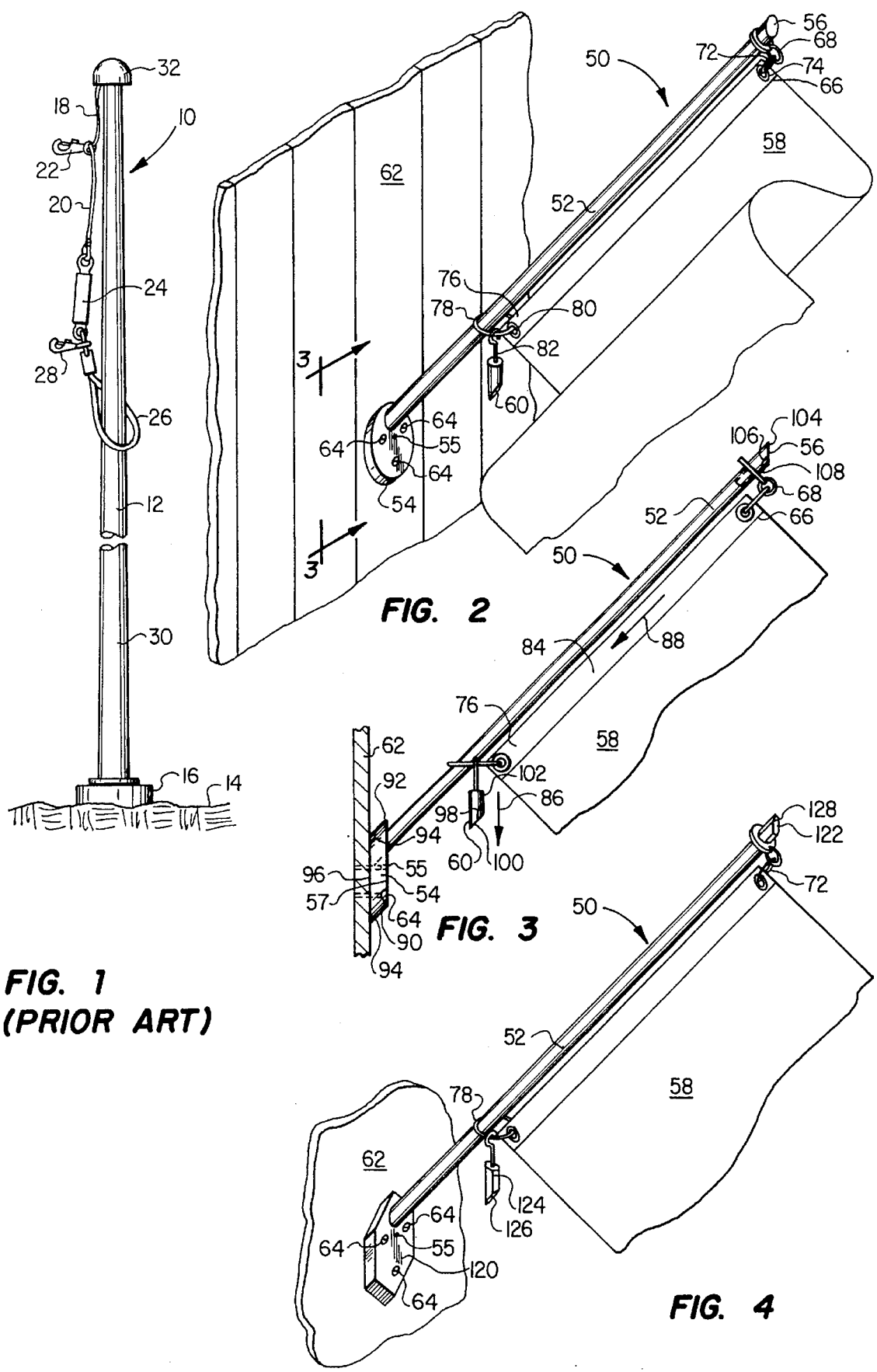

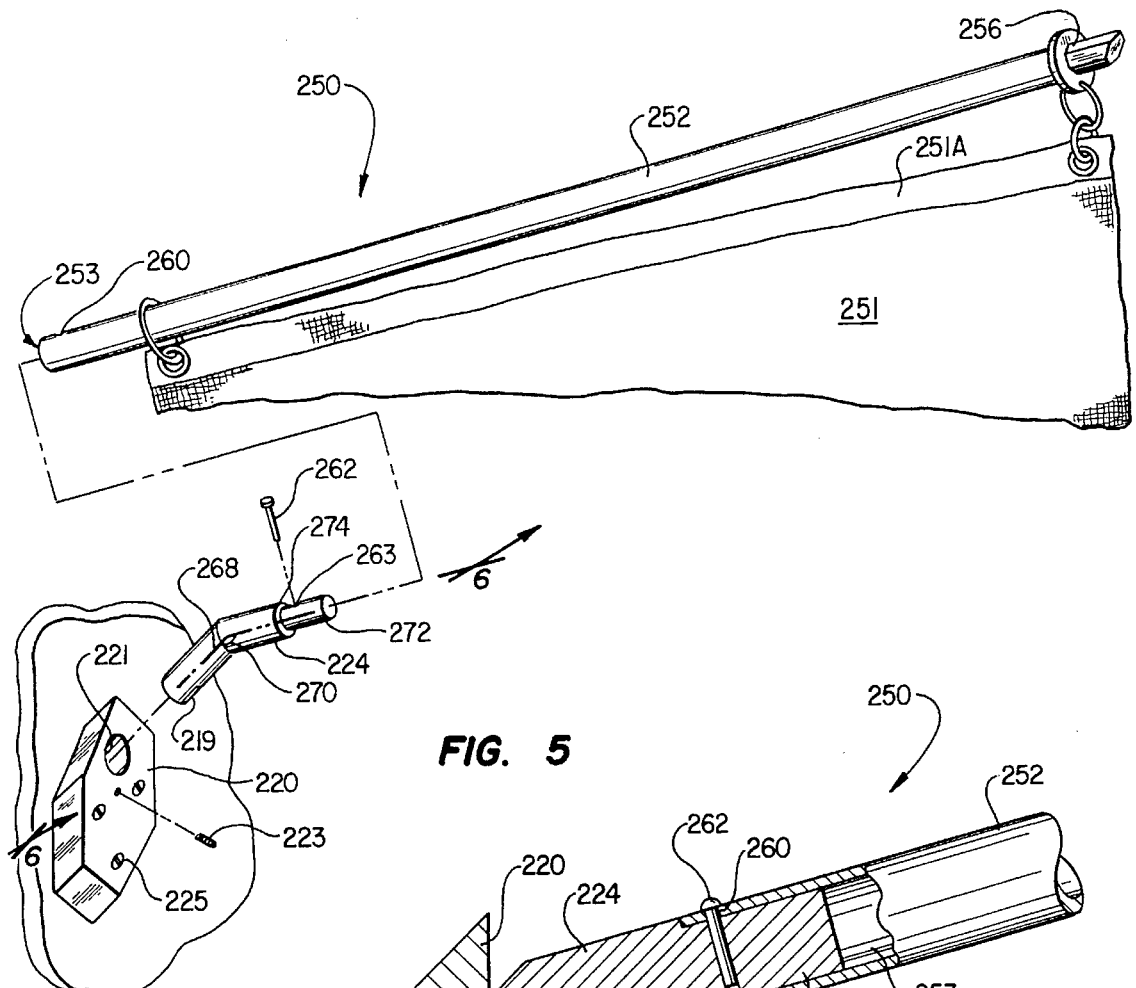
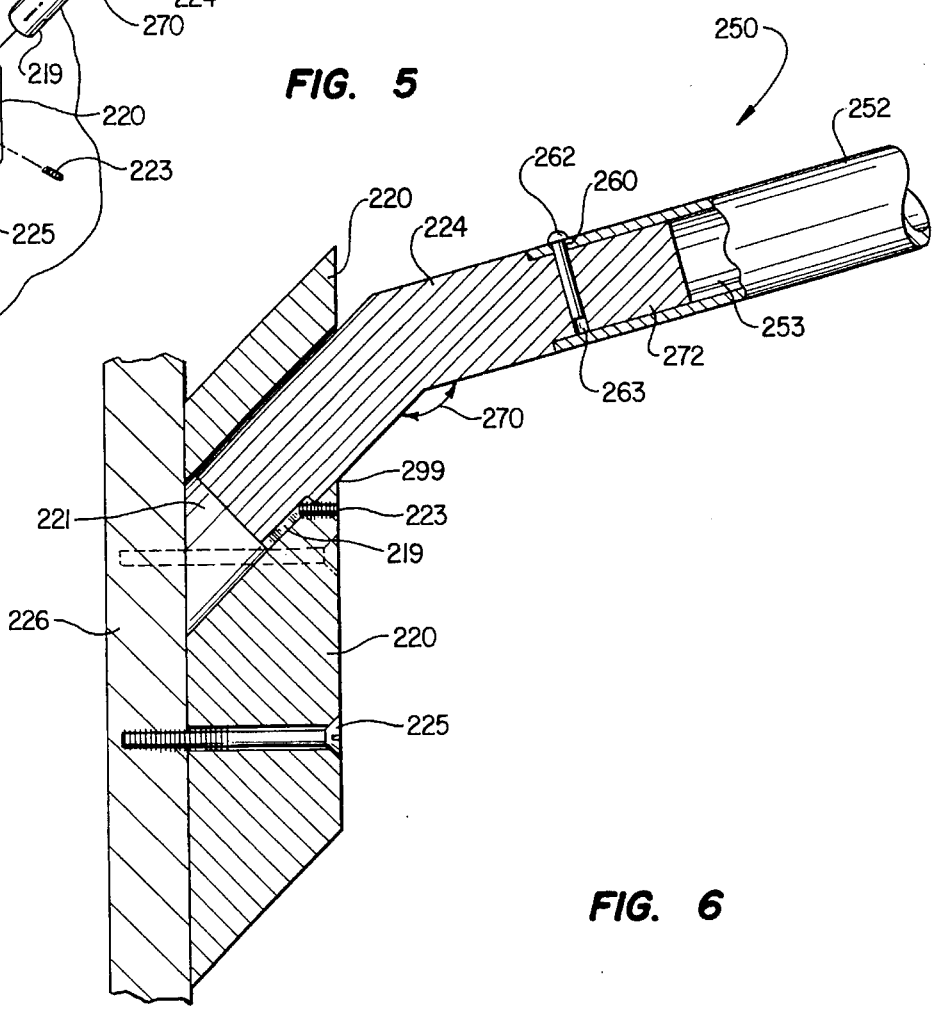
FIG. 5
FIG. 6

FLAG SUPPORT SYSTEM

The present application is a Continuation-in-Part of Co-Pending U.S. patent application Ser. No. 08/276,068, filed Jul. 15, 1994.

BACKGROUND OF THE INVENTION

1. Field of the Invention

The present invention relates to flag support systems and, more particularly, to an improved angulated flag staff system for securely positioning a flag staff at a variety of select angles.

2. History of the Prior Art

Banners and flags have been displayed from buildings and poles for centuries in one form or another. The contemporary form of a flag display incorporates a generally rectangular cloth member having the appropriate indicia formed thereon and suspended from a vertically disposed flag pole or an angulated staff. The flag staff generally extends outwardly from a vertical surface, such as a building wall or vertical column, whereas flag poles are mounted in the ground. Typically, vertical flag poles are rather large in construction and are used for large residential structures, as well as a myriad of commercial areas. The staff for use in presenting a flag in an angulated configuration relative to a vertical surface is generally of a shorter length and adapted for support of a flag therefrom. It may be hollow or solid and made from wood, metal or fiberglass. These staffs may be strong and attractive but they generally have an outside diameter that is not machine finished and which varies in size due to material characteristics and tolerances.

A variety of systems have been developed for positioning and securing flags to vertical, horizontal, and angulated positions. In the main, the systems include a means for maintaining a degree of tautness at the bottom of the flag nearest the support member. For example, U.S. Pat. No. 5,335,621, assigned to the assignee of the present invention provides an improved, angulated flat support system. This system is used for a particular flag staff having a hollow end of relatively precise size. Not all materials lend themselves to this mounting technique.

Addressing now upstanding flag poles, the requisite securing system may include retainer loops appropriately securing the top and bottom of the heading of the flag about the flag pole and/or weight members that may depend from the generally horizontally disposed flag. The weight members provide a means for maintaining a degree of tension in the flag in a manner that allows some degree of movement. Such retainer loops are currently in use by commercial enterprises, such as banks, for vertical flag poles.

Many staffs used for angulated display of flags are not as well equipped with regard to means for maintaining the tautness at the bottom of the flag. In certain instances, ropes have been used to secure the flag about the flag staff but various disadvantages are associated therewith. Not the least of these disadvantages is the aesthetic appearance of such a rope around the flag staff. However, in most cases on a staff the flag is secured by a halyard with snaps for the top and bottom attachment holes. This design also has disadvantages. The use of other tensioning devices has apparently not been accepted in prior art flag assemblies. Another problem is orienting the flag staff and flag in the most aesthetically pleasing position which may be, in some instances, nearly horizontal with the ground. In those instances, tensioning of the flag is not the major problem, but rather the mounting of the flag staff. With a straight flag staff extending from a generally horizontal mounting hole, the staff can be easily dislodged relative to the staff disposed at a steep angle. In addition, the outer diameter of flag staffs are often not machined or even constructed to very close tolerances. When the mounting hole is relatively short, size variations of the flag staff can lead to loose fitting staff, resulting wobble, and even dislodgement in high winds. It would be an advantage to incorporate a system utilizing certain advantages of prior art flag support systems with the multitude of additional advantages in accordance with the principles of the present invention.

The invention set forth and described in co-pending patent application Ser. No. 08/276,068, which is the parent to the present application, teaches a system which overcomes many of the problems of the prior art. In that system, a flag support system utilizing a base member which receives a re-angulating shaft is provided. This particular mounting configuration permits the secured mounting of a hollow flag staff at a steep angle in the base member, but where the flag staff itself assumes a position of much less angularity. Although this re-angulation system provides many advances over the prior art, it does not specifically address the aforementioned outer diameter size variations and wobble that can result therefrom. In particular, it does not address the utilization of a solid flag staff made of wood or the like which has no tubular portion for an internal mounting. It also does not address the need for a female mounting of such staffs, hollow or solid. It would be an advantage, therefore, to incorporate a system utilizing the distinct advantages of the above-referenced copending patent application that could also facilitate receipt of both hollow and solid flag staffs into a female member affording reangulation advantages. Such a system could then more effectively utilize commercial flag staffs.

The present invention overcomes the problems of the prior art by providing a flag staff support system utilizing a base member which receives a re-angulating assembly comprising an elongate female member for receipt of a male member comprising the end of a hollow or solid flag staff. This mounting permits the securement of flag staffs in a variety of re-angulated positions.

SUMMARY OF THE INVENTION

The present invention relates to an angulated flag staff assembly. More particularly, one aspect of the invention includes a flag staff assembly comprising an elongate staff adapted for the support of a flag thereon. A first means for mounting the staff in a first angulated position is provided with second means for receipt and re-angulating the staff in a second position. The second means includes a female mounting section for receipt of conventional flag staffs. Additional re-angulating means may also be provided for select or varied, angulation settings. The exact angle will vary depending on the selection of the re-angulating means. In this manner the flag staff is secured in the mounting means at a sufficient angle for reliably securing the flag staff thereto while any of a variety of mounting angles of the staff may be provided outwardly therefrom.

In another aspect, the first mounting means comprises a decorative assembly comprising an ornamental base member adapted for securing the staff at a sufficiently steep angle for securement to a generally vertical surface. The second means for re-angulating the staff comprises a shaft having a male end and a female end adapted for reducing the angle of the shaft as it would extend from the base member in the first angulated position. The shaft is adapted for receipt of the staff therein and the female end is, in one embodiment, at least 50% longer than the male end for affording improved stability of the staff mounted therein.

BRIEF DESCRIPTION OF THE DRAWINGS

For a more complete understanding of the present invention and for further objects and advantages thereof, reference may now be had to the following description taken in conjunction with the accompanying drawings in which:

FIG. 1 is a side-elevational view of a prior art flag pole assembly illustrating various aspects thereof;

FIG. 2 is a perspective view of one embodiment of a flag staff assembly constructed in accordance with certain ones of the principles of the present invention and illustrating a flag in association therewith;

FIG. 3 is a side-elevational view of the flag staff assembly of FIG. 2;

FIG. 4 is a perspective view of an alternative embodiment of the assembly of FIG. 2;

FIG. 5 is an exploded perspective view of one embodiment of an angulated flag staff assembly constructed in accordance with certain ones of the principles of the present invention;

FIG. 6 is an enlarged, side elevational, fragmentary cross sectional view of a portion of the flag staff assembly of FIG. 5 taken along lines 6—6 thereof;

DETAILED DESCRIPTION

Figure 7:
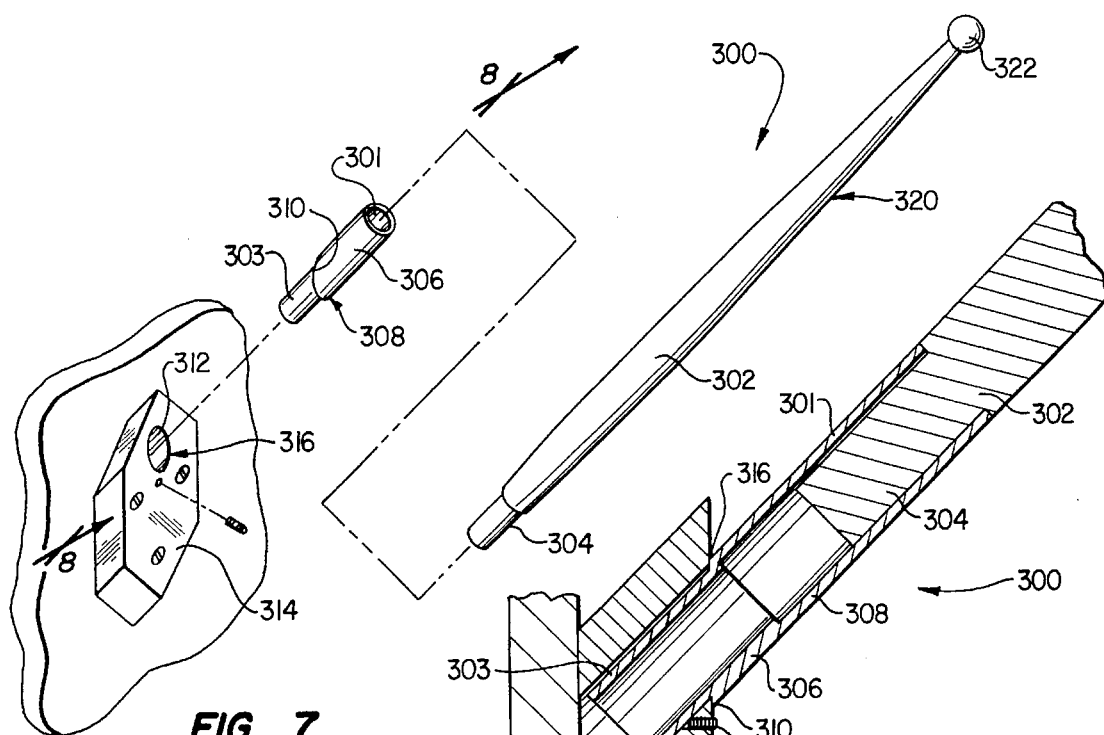
FIG. 7 is an exploded, perspective view of another embodiment of an angulated flag staff assembly constructed in accordance with the principles of the present invention.

Referring first to FIG. 1 there is shown a prior art flag pole assembly 10 incorporating an upstanding flag pole 12 secured into the ground 14 by a base 16. The flag pole assembly 10 further includes a flag support structure in the form of an internal halyard 18. A lanyard 20 and a snap 22 are disposed on the distal end of the halyard 18, and a weight 24 is disposed on the distal end of the lanyard 20. Further, a retaining loop 26 and a snap 28 are disposed on the distal end of the weight 24. Also, a decorative cap 32 is disposed on the upper end of the flag pole 12 and covers the access to the halyard 18. A flag (not shown) is secured to the snaps 22, 28 and is supported from the flag pole 12 in display of the indicia thereon.

Conventional flag poles, such as the flag pole assembly 10, have numerous features that permit ease in the assembly to, and presentation of, the flag thereon. Both the size and the shape of the flag pole have improved over the years and today include various attractive design features and enhanced finishes. One of the more significant aspects of the flag pole is the internal halyard 18 and the suspension of the flag therefrom. The internal halyard 18 is generally utilized with conventional flag poles and permit ease in the support of the flag from the pole. Further, the internal halyard 18 substantially reduce the availability of the halyard system for vandalism. The internal halyard 18 is of course more aesthetically appealing than an external halyard.

Flag poles are conventionally utilized to display flags and/or decorative members therefrom. In that regard, the flag pole 12 generally incorporates an attractive finish upon an outer surface 30 and a corresponding decorative cap 32 disposed on the upper end of the flag pole. In the prior art illustration of FIG. 1, the weight 24 is attached to the lanyard 20 and then to the halyard 18 and generates tension upon the halyard 18 to allow a flag to be lowered under its own weight when utilizing the internal halyard 18. The weight 24 also imparts a tension from the bottom end to the top end of a flag to maintain a tautness theredown. By utilizing a counterweight, the retaining loop 26 may be utilized therebeneath for securing the lower portion of the weight 24 to the flag pole 12. In earlier versions of flag pole assemblies, an external halyard was utilized and the lower snap 28 was generally secured to a portion of the halyard, and the halyard was usually tightened from near the base 16 of the flag pole 12 by wrapping such around a cleat. These are all conventional elements of flag pole systems and are described and/or illustrated herein for purposes of reference.

Referring now to FIG. 2, there is shown a flag staff assembly 50 constructed in accordance with certain ones of the principles of the present invention. The flag staff assembly 50 incorporates an elongate staff 52, a base or mounting member 54 an end piece or final 56, and a weight 60. The final 56 is an ornament added to the flag staff for decoration and as a means for supporting the top end of the flag. A flag 58 is shown secured to the staff 52 with the weight 60 depending therefrom. In the configuration shown herein, both functional and aesthetic advantages are provided.

Still referring to FIG. 2, the flag staff assembly 50 is positioned against, and secured to, a vertical wall 62. The base 54 is secured to the vertical wall 62 by plurality of fastening elements or screws 64 extending therethrough. Likewise the staff 52 is secured within the base 54 by a set screw 55. This is but one embodiment of a securement option and the fastening element of the base 54 may also be assembled from behind in an alternative embodiment. A top end 66 of the flag 58 is secured to the staff 52 by a mounting ring 68. The mounting ring 68 is attached to the final in various methods, such as that shown herein. A fastening member 72 connects the mounting ring 68 to an eye 74 formed in the top end 66 of the flag 58. The bottom end 76 of the flag 58 is secured to the staff 52 by a fastening ring 78 that extends through an eye 80 disposed in the bottom end of the flag 58, and around the staff 52 with the weight 60 depending therefrom. The weight 60 is connected to the fastening ring 78 by a connector 82. The connector 82 is shown assembled to the fastening ring 78 for purposes of illustration. It should be noted that the connector 82 could easily be received directly within the eye 80 to apply the necessary tension to the flag 58, as will be described below.

Referring now to FIG. 3, there is shown a side-elevational, cross sectional view of the flag staff assembly 50 taken along lines 3—3 thereof. The flag staff assembly 50 is shown to be mounted to the vertical wall 62 by the fastening elements 64 as described above. The set screw 55 is also shown by dotted lines. The base 54 is also shown with dotted lines illustrating a plurality of countersunk apertures 57 adapted for receiving, and engagement with, the fastening elements 64 therein. Of course, in another embodiment the fastening assembly could be disposed behind the face of the base. More particularly, FIG. 3 illustrates that tension is maintained on bottom end of a heading 84 of the flag 58 by the weight 60 depending therefrom and applying a downward force in the direction of an arrow 86. The top end 66 of the heading 84 of the flag 58 is secured by the mounting ring 68 connected to the final 56 as described above. A force indicated by arrow 88 is provided by the pull of gravity upon the weight 60. Unlike prior art flag staff arrangements, the flag 58 is therein assembled to the staff 52 while maintaining a taut heading 84 thereacross. The weight 60 acts upon the bottom end 76 of the flag 58 in an angulated relationship. Unlike the weight 24 of FIG. 1, the weight 60 is not part of a halyard system for mounting the flag 58 and is provided solely for the purpose of maintaining tautness across the heading 84, as well as the aesthetic appearance thereof.

Referring still to FIG. 3, it may be seen that the weight 60, base 54 and final 56 are all constructed with a common aesthetically pleasing design element. These parts could be machined, cast, coined, rolled or otherwise formed with similar aesthetic features. The parts may also be formed from brass, copper, bronze, steel, iron, aluminum, fiberglass, polymers and the like. In the present embodiment, the base 54 comprises a member having angulated side walls 90 and 92 disposed in generally parallel spaced relationship and at an angle 94 relative to a backwall 96 that iS substantially identical to an angle 98 defined between a surface 100 and a cylindrical side wall 102 of the weight 60 adjacent thereto. Likewise, the final 56 has a surface 104 that forms an angle 106 with a cylindrical side wall 108 that is also substantially identical or similar to the angles 94 and 98. In a preferred embodiment, the final, base and weight 56, 54 and 60, respectively, are of a similar design, are made of similar material, such as brass, with a similar finish, to therein provide an aesthetically pleasing appearance to the flag staff assembly 50 and in the configuration affording functional utility of maintaining the tautness along the heading 84 of the flag 58.

Referring now to FIG. 4, there is shown an alternative embodiment of the flag staff assembly 50 wherein a base 120 is utilized in conjunction with a final 122 and a weight 124 each having common, or similar, aesthetic aspects thereof. The staff 52 is of course identical to that shown in FIG. 3 and the other attachment elements, such as the fastening member 72 and the fastening ring 78, are identical. What is not identical is the shape of the base 120, the shape of the weight 124 and the shape of the final 122. In this particular embodiment, each of these elements incorporates a six-sided prismatic solid having an angulated side portion similar to the angulated side wall 90 of the base 54 discussed relative to FIG. 3. However, the weight 124 and the final 122 are also constructed with six sides and an angulated bottom surface 126 to an angulated top surface 128 corresponding in the matter described relative to the surfaces 100 and 104, respectively, of FIG. 3. The base 120 is shown secured to the vertical wall 62 by the fastening elements 64.

Referring now to FIG. 5 there is shown an exploded perspective view of one embodiment of an angulated flag staff assembly 250 constructed in accordance with certain ones of the principles of the present invention. The assembly 250 incorporates a re-angulating shaft 224 that may be received within an aperture 221 of the base 220 in place of the end of the flag staff itself. In that regard, the flag staff 252 of this embodiment is constructed either of a hollow construction and/or having a hollow region 253 formed in the lower end or a lower end fitting thereof. Hollow region 253 is adapted for matingly receiving a neck portion 272 of shaft 224. Neck portion 272 is constructed with an aperture 263 formed therein adapted for receiving a pin 262 therein. The aperture 263 is formed adjacent to shoulder 274 adapted for abutting engagement with the end of hollow staff 252. In this particular configuration, as shown most clearly in FIG. 6, the flag staff 252 may be re-angulated relative to the base 220 into a position substantially more horizontal, or in some cases more vertical, than that position which would be assumed if the flag staff 252 were inserted directly into the aperture 221 of the base 220. In this manner, a flag staff 252 may be positioned to a select angle between 90° and 175° relative to vertical. The select angle is chosen to be more aesthetically pleasing and/or practical for certain banners, festival flags, pennants and the like. With such a configuration, however, the weight described above would no longer be necessary The term "generally horizontal" as used herein includes angles of to and including around 15° relative to the horizontal.

Referring still to FIG. 5, a final 256 is shown at the end of staff 252 opposite the aperture 260 formed in the opposite end thereof and adapted for receiving the pin 262 therethrough. A flag 251 is shown attached to staff 252. A center line 268 is shown in and along the re-angulating shaft 224 for illustrating the angle 270 formed therein whereby flag 251 will hang down in a more vertical direction. It is the angle 270 which is the re-angulating angle for disposing a shaft 252 in the generally horizontal configuration addressed above. Consistent with the description above, threaded fasteners 225 are utilized for securing the base 220 to vertical surface 226. A set screw 223 is provided and adapted for extending through base 220 into a groove 219 formed in the shaft 224. The set screw 223 prevents the shaft 224 from rotating and changing the angle which the flag staff 252 assumes relative to the horizontal.

Referring now to FIG. 6 there is shown an enlarged, side elevational, fragmentary cross sectional view of a portion of the flag staff assembly of FIG. 5 taken along lines 6—6 thereof. In this particular view it may be seen that the angle 270 is positioned in this particular configuration to re-angulate the flag staff 252 into a position only slightly inclined from the horizontal. As shown in FIG. 5, a flag hanging from the staff 252 would not need a weight to maintain he tautness thereof. It may be preferable in some applications to form a sleeve (not shown) on the heading 251A, as is conventional in the industry. A sleeve can then slide over the shaft 252 of FIG. 5 to further eliminate any sagging problems of the flag at lower angles. At higher angles of around 30° or greater, relative to horizontal, rings and a weight (FIG. 2) may be preferable.

Still referring to FIG. 6, set screw 223 is shown extending through the base 220 into the groove 219. Threaded fastener 225 is shown extending through the base 220 into a supporting region such as wall 226. The pin 262 is shown extending through aperture 260 of staff 252 and through aperture 263 of neck portion 272 of shaft 224. The angle 270 can of course be varied to provide a different number of angulated varieties in conjunction with the principles of the present invention. Moreover, a series of re-angulating shafts 224 having different angles 270 may be provided for a single flag staff 252 and its positioning at select angles in accordance with the preference of the user.

In accordance with certain ones of the principles of the present invention, the flag staff assembly 250 incorporates the two aesthetically matched elements of the base 220 and the final 256 to provide, in conjunction with the staff 252 and re-angulating shaft 224 (or set of shafts 224 having different angles 270), an assembly that is capable of supporting the flag 58 in an aesthetically pleasing and functionally correct generally horizontal configuration with advantages not heretofore found in conventional flag staff assemblies. Of course, any size, shape or color of the final and base could be used. Likewise, any aesthetically pleasing similarity between the final and base could be utilized in accordance with the principles of the present invention. In addition, at those angles where it is desirable to use the weight to apply downward tension on the heading, the weight would also have a similarity to the base and final.

As set forth above, the re-angulating shaft 224 of the present invention permits the flag staff 252 to be securely mounted to the base 220. This secured mounting is provided by the relatively steep angle of the aperture 221 formed in the base 220. The steep angle of the aperture 221 is sufficient to secure any flag staff inserted therein by virtue of the weight thereof. The weight of the flag staff tends to bend the flag staff across the top edge 299 of the aperture 221, as shown in FIG. 6, which pressure thereagainst causes the assembly to be locked in place. If aperture 221 was generally horizontal, lateral forces on the flag or flag staff (such as wind) could result in the flag staff being dislodged from the aperture and falling. Securement means such as clamps could, of course, be utilized but, the present invention provides improved securement means by utilizing the steep angle of the aperture 221 and the base member 220 and the installation of the angulated shaft 224 which thereby provides for the flag staff 252 to extend outwardly therefrom in any of a variety of angles relative thereto. As stated above, the re-angulating shaft 224 may be provided in a variety of angles for different applications. The angle 270 of the shaft 224 may vary to the point of providing the flag 251 (as shown in FIG. 5) in a totally horizontal configuration and/or in a variety of other angles.

In certain embodiments of this particular aspect of the present invention, a plurality of angulated shafts 224 having different angles 270 may be provided with a single base 220 for allowing flexibility in the use thereof in the hanging of flags of different varieties therefrom. Likewise a variety of materials may be utilized in the fabrication of the base member, the re-angulating shaft 224 and/or flag staff 252 for the embodiments shown in FIGS. 1–6. These materials include brass, bronze, other copper alloys, aluminum, iron, fiberglass, polymers, and the like. Any single one and/or all of the elements described herein may be formed from these materials and/or a common material. In a preferred embodiment of the invention of FIGS. 1–6, the final 256 and the base 220 are both formed with common aesthetic parts such as the angled sidewalls thereof and of a common material, such as brass. And, where it is desirable to use the weight, it also will have common aesthetic parts with the base and final.

Referring now to FIG. 7, there is shown a perspective view of one embodiment of the flag staff support system 300 of the present invention. In this particular embodiment, the flag staff 302 is of generally solid construction (although it may also be hollow) and includes a necked male end 304 adapted for receipt into a hollow, female portion 301 of shaft extender 306. The shaft extender 306 of this particular embodiment is constructed with a tubular body 308 adapted for receipt of the flag staff 302 in the female portion 301 thereof. The tubular body 308 of extender 306 includes a male mounting portion 303, which may be solid in construction (not shown) and a mounting lip 310 constructed in an axially eccentric, circular configuration adapted for facilitating flush engagement with aperture 312 of mounting bracket 314 for securement thereagainst. It may be seen that the lip 310 appears to have an elliptical shape when viewed in this perspective view. As described below, the lip 310 of the extender 306 engages a flat frontal region 316 of the mounting bracket 314 adjacent the aperture 312 for securement thereagainst. The aperture 312 is formed at an angle within the mounting bracket 314. The aperture 312 is thus not perpendicular to the frontal surface 316 of the mounting bracket. It is the engagement between lip 310 and the frontal surface 316 that provides certain ones of the advantages of the present invention by enhancing the structural reliability thereof and the resistance to rotation therearound.

Figure 8:
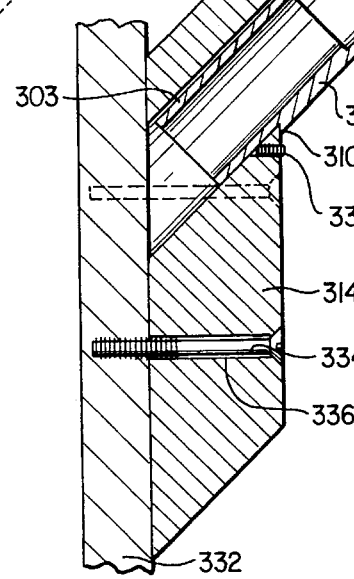
FIG. 8 is a side elevational cross-sectional view of the flag staff mounting of FIG. 7 taken along lines 8—8 thereof.
Figure 9:
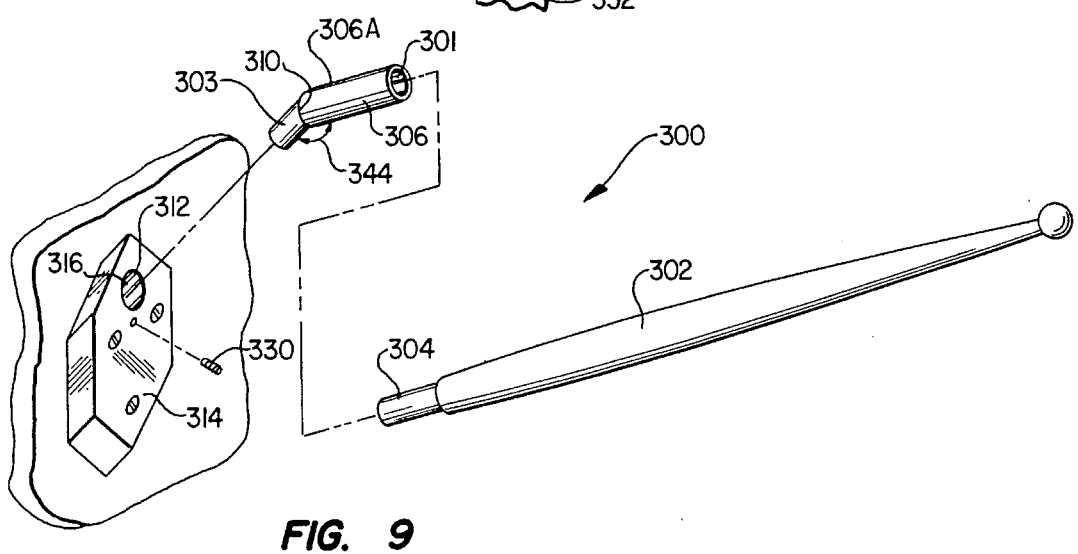
FIG. 9 is an exploded, perspective view of another embodiment of the present invention.

Unlike the above referenced embodiments of the flag staff extender of FIGS. 1–6, a flag staff which is solid or which has too narrow a tubular opening may be used with the extender 306 of the present invention shown in FIGS. 7–9. The flag staff 302 may be formed of wood, fiberglass metal, or the like, the advantages of which depend on the type of material being utilized. Structurally and aesthetically, a number of advantages are afforded the user of extender 306, not the least of which is the ability to receive a variety of conventional flag staffs therein, both hollow and solid. A solid member such as wood or the like can also be turned on a lathe to provide the tapered sides 320 and the ornate end 322 in the aesthetically pleasing configuration shown. In addition, a flag staff 302 an be fabricated by the user of assembly 300 simply by providing the necessary mounting neck 304 for the particular extender 306.

Referring now to FIG. 8, there is shown an enlarged, side-elevational, cross-sectional view of the System 300 of the present invention. In this embodiment, the flag staff 302 is shown in cross-section to be of generally solid construction, including the necked end region 304 received into the hollow-shaft extender 306. In this embodiment, the hollow shaft extender 306 is straight as compared with the angular version of the hollow shaft extender 306A shown in FIG. 9 and discussed below. Referring still to FIG. 8, the mounting lip 310 of tubular body 308 is shown in abutting engagement with frontal surface 316 discussed above. A set screw 330 is shown secured against the extender 306 for securement thereof within the mounting bracket 314. The mounting bracket 314 is shown secured against a surface 332 by screws 334 extending through apertures 336 of said bracket. The male end 303 is received within the aperture 312, which male end 303 is shorter than the female end 301. In this particular embodiment, female end 301 is approximately 50% longer than male end 303. This allows a longer length of staff 304 to be inserted therein. Since the outside diameter of flag staffs are often not machined to close tolerances, this longer mounting length accommodates a looser fit.

Referring now to FIG. 9, an angulated extender 306A is shown for use in conjunction with the same flag staff 302, hollow or solid. The extender 306A may be received within the same mounting bracket 314 having the same aperture 312 formed therein as described above in FIG. 7. A set screw 330 may likewise be utilized as described in FIG. 8. In addition, the lip 310 is also provided as described above for securement against the surface 316 of said bracket. In this embodiment, the neck region 304 of flag staff 302 is received within the hollow region of body 306 to provide said flag staff at the appropriate angle. The angle of the flag staff is, of course, defined by the angular relationship between male end 303 and female end 301 of the extender 306A. An angle 344 is formed between said body sections 303 and 301, which angle 344 may be selected for the most desired angle of the flag staff 302. It may be seen at the angle 344 may be varied in different embodiments of an angular extender 306A. In such a configuration, a series of angulated extenders 306A (with different angles) may be provided so that select angles can be utilized for a varying occasions and/or angles of the supporting wall 332 (FIG. 8).

Referring now to FIGS. 7 through 9 in combination, it may be seen that the solid flag staff assembly 300 of the present invention may be utilized with the hollow extender 306 and 306A having both a straight and an angular shape, respectively, for a variety of mounting configurations. In this manner, a variety of flag staffs or banner support arms can be utilized on conjunction with the principles of the present invention.

It should also be noted that the present invention as illustrated in FIGS. 7–9 may be used with a wooden flag staff having an outside diameter that is not precisely machined. Wood may also expand or contract with temperature and moisture. The extenders 306 and 306A of FIGS. 7–9 are particularly adapted for flag staffs that do not have machined end portions of the type that may be utilized in injunction with the extender of FIGS. 5 and 6. The inside diameter of the female end 301 of the extenders 306 and 306A is preferably reamed slightly larger than the stated outside diameter of the flag staff 302 being inserted therein. For example, the flag staff 302, either hollow or solid, having a stated outside diameter of 1" may have an outside diameter of 1.1" and therefore the female end 301 may be reamed to an insider diameter of 1.2". This allows for manufacturing variations of both metal and fibreglass flag staffs outside diameters and the expansion and contraction of wood flag staffs as described above. As also described above, the increased length of the female end 301 relative to the male end 303 greatly reduces the problem of wobble of the flag staff 302 In one embodiment, the female end 301 is made on the order of 3" with the male end 303 made on the order of 1.5". The adapters 306 and 306A, as shown in FIGS. 7–9, may also be made of brass, copper, steel, aluminum and any other materials referred to above with regard to FIGS. 5 and 6.

It is thus believed that the operation and construction of the present invention will be apparent from the foregoing description. While the method and apparatus shown or described has been characterized as being preferred it will be obvious that various changes and modifications may be made therein without departing from the spirit and scope of the invention as defined in the following claims.

We claim:

1. An improved flag staff assembly of the type wherein an elongate flag staff is disposed at an angle relative to a generally vertical surface and is disposed above a ground region, wherein the improvement comprises:

a base member adapted for securement to said vertical surface in support of said flag staff therefrom, said base member being formed with a female aperture therein adapted for securement of said flag staff in a first angulated position therefrom; and means for mounting said flag staff to said base member in a select position, said means for mounting including a mounting shaft having first and second ends, said first end comprising a male member adapted for receipt into said female aperture and said second end comprising a female member for receipt of said flag staff therein, said mounting shaft also includes a mounting lip positioned between said first and second ends and constructed in an axially eccentric, circular configuration adapted for facilitating flush engagement with said base member for securement thereagainst when said male member is within said female aperture.

2. The assembly as set forth in claim 1 wherein said mounting shaft is formed at an angle between said first and second ends adapted for reorienting said flag staff.

3. The assembly as set forth in claim 1 wherein said flag staff includes a neck portion adapted for being received within said female member of said second end of said mounting shaft in secured engagement therewith.

4. The assembly set forth in claim 1 wherein said first end of said mounting shaft includes a groove formed therein, said groove being adapted for receiving an elongate member extending through said base member for securement of said mounting shaft in said base member.

5. A method of suspending a flag from a flag staff supported at an angle relative to a generally vertical surface comprising the steps of:

providing a base member for securement to said vertical surface in support of said flag staff therefrom;

forming an aperture in said base member for receiving said flag staff therein for support of said flag staff in a first angulated position outwardly therefrom;

providing mounting means for re-angulating said flag staff in another angulated position relative to said aperture in said base member, said mounting means being formed with a female end for receipt of said flag staff therein, a male end for receipt within said apertures and a mounting lip positioned between said female end and said male end and constructed in an axially eccentric, circular configuration adapted for facilitating flush engagement with said base member for securement thereagainst when said male end is within said aperture;

inserting said male end of said mounting means into said aperture in said base member; and securing said flag staff within said female end of said mounting means for positioning said flag staff in said another angulated position.

6. The method as set forth in claim 5 and further including the step of forming said mounting means as a shaft having an angle formed therein for reorienting said flag staff secured thereto.

7. The method as set forth in claim 6 and further including the step of forming said flag staff with a neck region adapted for insertion within said female end of said mounting means.

8. The method as set forth in claim 6 and further including the step of forming said mounting means with a groove therein, said groove being adapted for receiving a threaded fastener extending through said base member for securement of said mounting means in said base member.

9. The method as set forth in claim 5 and further including the step of forming said staff with a taper.

10. The method as set forth in claim 5 and further including the step of forming said staff of wood.

11. The method as set forth in claim 5 and further including the step of forming said mounting means from a tubular member.

12. The method as set forth in claim 5 and further including the step of forming said mounting means with said female end having a length of the order of 50% greater than the length of said male end.

* * * * *